(12) United States Patent
Miller

(10) Patent No.: US 6,773,541 B2
(45) Date of Patent: Aug. 10, 2004

(54) METHOD FOR PROCESSING A SUBSTRATE USING PRESSED TOGETHER SUPPLY ROLLS

(75) Inventor: David D. Miller, Phoenix, AZ (US)

(73) Assignee: Xyron, Inc., Scottsdale, AZ (US)

(*) Notice: Subject to any disclaimer, the term of this patent is extended or adjusted under 35 U.S.C. 154(b) by 26 days.

(21) Appl. No.: 10/339,573

(22) Filed: Jan. 10, 2003

(65) Prior Publication Data

US 2003/0098123 A1 May 29, 2003

Related U.S. Application Data

(62) Division of application No. 09/966,012, filed on Oct. 1, 2001, now Pat. No. 6,527,028.
(60) Provisional application No. 60/236,750, filed on Oct. 2, 2000.

(51) Int. Cl.$^7$ ................................................ B32B 31/08
(52) U.S. Cl. ...................... 156/324; 156/555; 156/580; 100/176
(58) Field of Search ................................ 156/324, 543, 156/555, 580, 582, 583.1; 100/155 R, 176

(56) References Cited

U.S. PATENT DOCUMENTS

| | | |
|---|---|---|
| 2,191,704 A | 2/1940 | Bennett |
| RE23,542 E | 9/1952 | Bihary |
| 2,954,069 A | 9/1960 | Lithio |
| 3,010,508 A | 11/1961 | Wilson et al. |
| 3,043,365 A | 7/1962 | Gustafson |
| 3,309,983 A | 3/1967 | Dresser |
| 3,343,978 A | 9/1967 | Engelbach |
| 3,698,990 A * | 10/1972 | Shields ........................ 156/522 |
| 3,737,359 A | 6/1973 | Levitan |
| 3,944,455 A | 3/1976 | French |
| 3,962,021 A | 6/1976 | Weisfeld |
| 4,001,073 A | 1/1977 | Jones et al. |
| 4,021,288 A | 5/1977 | Hannon et al. |
| 4,068,028 A | 1/1978 | Samonides |
| 4,094,719 A | 6/1978 | Jones et al. |
| 4,193,342 A | 3/1980 | Held |
| 4,353,776 A | 10/1982 | Giulie et al. |
| 4,531,690 A | 7/1985 | Condy |
| 4,541,889 A | 9/1985 | Held |
| 4,863,543 A | 9/1989 | Shiozawa et al. |
| 4,891,090 A | 1/1990 | Lorincz et al. |
| 4,891,677 A | 1/1990 | Shiozawa et al. |
| 4,966,639 A | 10/1990 | Pfeffer et al. |
| 5,288,714 A | 2/1994 | Marschke |
| 5,295,753 A | 3/1994 | Godo et al. |
| 5,316,613 A | 5/1994 | Samuelson et al. |
| 5,380,395 A | 1/1995 | Uchida |
| 5,397,427 A | 3/1995 | Traise et al. |
| 5,470,428 A | 11/1995 | Sanko |
| 5,472,554 A | 12/1995 | Ko et al. |
| 5,484,499 A | 1/1996 | Marschke |
| 5,580,417 A | 12/1996 | Bradshaw |
| 5,584,962 A | 12/1996 | Bradshaw et al. |
| 5,639,332 A | 6/1997 | Instance |
| 5,679,203 A | 10/1997 | Sakai |
| 5,735,998 A | 4/1998 | Bradshaw |
| 5,788,796 A | 8/1998 | Look et al. |
| 5,788,806 A | 8/1998 | Bradshaw et al. |
| 5,795,435 A | 8/1998 | Waters, Jr. |
| 5,902,440 A | 5/1999 | Jenkins |
| 5,961,779 A | 10/1999 | Bradshaw |
| 6,244,322 B1 * | 6/2001 | Paque ........................ 156/555 |
| 6,422,281 B1 | 7/2002 | Ensign, Jr. et al. |

FOREIGN PATENT DOCUMENTS

| | | |
|---|---|---|
| EP | 0 275 670 | 7/1988 |
| EP | 0 794 054 | 9/1997 |
| WO | WO99/24257 | 5/1999 |

* cited by examiner

*Primary Examiner*—Jeff H. Aftergut
*Assistant Examiner*—Jessica Rossi
(74) *Attorney, Agent, or Firm*—Pillsbury Winthrop LLP

(57) ABSTRACT

The present application discloses a substrate processing apparatus having a pair of pressed together supply rolls for applying pressure to perform the processing operation. The present application also discloses a method for processing a substrate wherein a pair of supply rolls are pressed together.

5 Claims, 6 Drawing Sheets

METHOD FOR PROCESSING A SUBSTRATE USING PRESSED TOGETHER SUPPLY ROLLS

The present application is a division of U.S. patent application Ser. No. 09/966,012 filed Oct. 1, 2001 now U.S. Pat. No. 6,527,028, which claims priority to U.S. Provisional Application No. 60/236,750 filed Oct. 2, 2000, the entirety of which is incorporated into the present application by reference.

FIELD OF THE INVENTION

The present invention relates to a substrate processing apparatus for performing a processing operation on a selected substrate. More specifically, the present invention relates to a substrate processing apparatus that has a pair of pressed together supply rolls for applying pressure to perform the processing operation.

BACKGROUND OF THE INVENTION

In conventional master processing apparatuses, such as the ones shown in U.S. Pat. Nos. 5,580,417 and 5,582,962, a pair of nip rollers are used to apply the pressure required to perform a master processing operation. More specifically, the devices disclosed in these prior art patents are designed to apply pressure with their nip rollers to adhere pressure-sensitive adhesive from one or both of the supply materials to the selected substrate being processed. The processing operations disclosed in these patents may include an adhesive transfer operation wherein the adhesive is transferred to only one side of the selected substrate to create a label or sticker; a laminating operation wherein each supply material has a layer of adhesive and the supply materials are adhered to both sides of selected substrate; or a combination laminating/adhesive transfer operation wherein one of the supply materials is adhesively bonded to one side of the selected substrate and the adhesive on the other supply material is transferred to the other side of the selected substrate.

The use of nip rollers in the types of devices shown in these prior art patents is well-known for applying the requisite pressure to bond the pressure-sensitive adhesive on one or both of the supply materials to the substrate being processed. However, the nip rollers represent a significant amount of both the cost and weight of the device. Further, the nip rollers add to the overall size and manufacturing complexity of the device. The nip rollers must be pressed together with the correct amount of force and also must be properly aligned to ensure a smooth, efficient processing operation.

While the types of devices shown in the '417 and '962 patents are quite suitable for their intended purposes, the costs associated with their manufacture can make their purchase undesirable for casual users who do not frequently use these devices to perform processing operations. To meet the needs of the casual user, it would be desirable to reduce some of the component and manufacturing costs associated with these conventional designs.

SUMMARY OF THE INVENTION

To meet the need described above, one aspect of the present invention provides a substrate processing apparatus for processing a selected substrate. The apparatus comprises a frame and a first supply roll rotatably mounted to the frame, the first supply roll comprising a first supply substrate having a first surface and a second surface. The first supply substrate is wound about the first supply roll such that the first surface thereof faces radially outward with respect to the first supply roll. A second supply roll is rotatably mounted to the frame. The second supply roll comprises a second supply substrate having a first surface and a second surface, the second supply substrate being wound about the second supply roll such that the first surface thereof faces radially outward with respect to the second supply roll. The first and second supply rolls are relatively movable toward one another to engage the first surfaces of the first and second supply substrates with one another.

At least the first surface of the first supply substrate has a layer of pressure-sensitive adhesive disposed thereon. The first surface of the second supply substrate may also have a layer of adhesive disposed thereon, depending on the type of processing operation to be performed. The apparatus of the invention may be configured for the processing operation to be a laminating operation as the processing operation, wherein the first supply substrate and the second supply substrate are both transparent laminating films and wherein the first surface of the second supply substrate also has a layer of adhesive disposed thereon. The apparatus may also be configured for the processing operation to be an adhesive transfer operation wherein the first supply substrate is a release liner and wherein the second supply substrate is a mask substrate devoid of adhesive. The mask substrate will cover any excess portions of the adhesive on the release liner exposed around a periphery of the selected substrate during the processing operation. Additionally, the apparatus according to the invention may be configured for the processing operation to be a combination laminating/adhesive transfer operation as wherein the first supply substrate is a release liner and wherein the second supply substrate is a transparent laminating film having a layer of adhesive disposed on the first surface thereof. Furthermore, the apparatus of the invention may be configured for the processing operation to be a magnet making operation wherein the first supply substrate is a flexible magnet substrate and wherein the second supply substrate is a mask substrate devoid of adhesive while wound on the second supply roll. As in the adhesive transfer operation, the mask substrate will cover any excess portions of the adhesive on the release liner exposed around a periphery of the selected substrate during the processing operation. It is to be understood that these specific types of processing operations are intended to be illustrative and non-limiting. The invention is intended to encompass any and all types of processing operations wherein adhesive bonding is affected between some or all of the substrates being processed.

The apparatus of the invention further comprises biasing structure biasing the first and second supply rolls towards one another such that the first surfaces of the first and second supply substrates are pressed into engagement with one another to enable performance of a processing operation wherein (a) the selected substrate is advanced in a feeding direction between the first and second supply rolls so that the pressed engagement of the supply rolls presses the first surfaces of the first and second supply substrates against opposing sides of the selected substrate so as to affect adhesive bonding between the substrates, and (b) the portions of the first and second supply substrates pressed against the selected substrate are unwound from the first and second supply rolls and advanced together with the selected substrate. The biasing structure continues to bias the first and second supply rolls towards one another as the first and second supply substrates are depleted from the supply rolls thereby maintain the pressed engagement of the supply rolls.

By using the supply rolls themselves to press the supply substrates against the selected substrate to affect adhesive bonding, the component and manufacturing costs associated with nip rollers are eliminated, thereby reducing the overall cost of the apparatus. Also, the weight and overall size of the processing apparatus may be reduced, if desired, by the elimination of the nip rollers.

Another aspect of the present invention provides a method for processing a selected substrate. The method comprises: providing a rotatable first supply roll and providing a rotatable second supply roll. The first supply roll comprises a first supply substrate having a first surface and a second surface. The first surface has a layer of pressure-sensitive adhesive disposed thereon and the first supply substrate is wound about the first supply roll such that the first surface thereof and the adhesive layer face radially outward with respect to the first supply roll. The second supply roll comprises a second supply substrate having a first surface and a second surface. The second supply substrate is wound about the second supply roll such that the first surface thereof faces radially outward with respect to the second supply roll.

The method further comprises pressing the first and second supply rolls together such that the first surfaces of the first and second supply substrates are pressed into engagement with one another. While the first and second supply rolls are pressed together, the selected substrate is advanced between the supply rolls so that (a) the pressed engagement of the supply rolls presses the first surfaces against the first and second supply substrates against the opposite sides of the selected substrate so as to cause said adhesive to bond to the selected substrate and (b) the portion of the first and second supply substrates pressed against the selected substrate and advanced together with the selected substrate.

Other objects, features, and advantages will become apparent from the following detailed description, the accompanying drawings, and the appended claims.

DETAILED DESCRIPTION OF THE INVENTION

Figure 1:
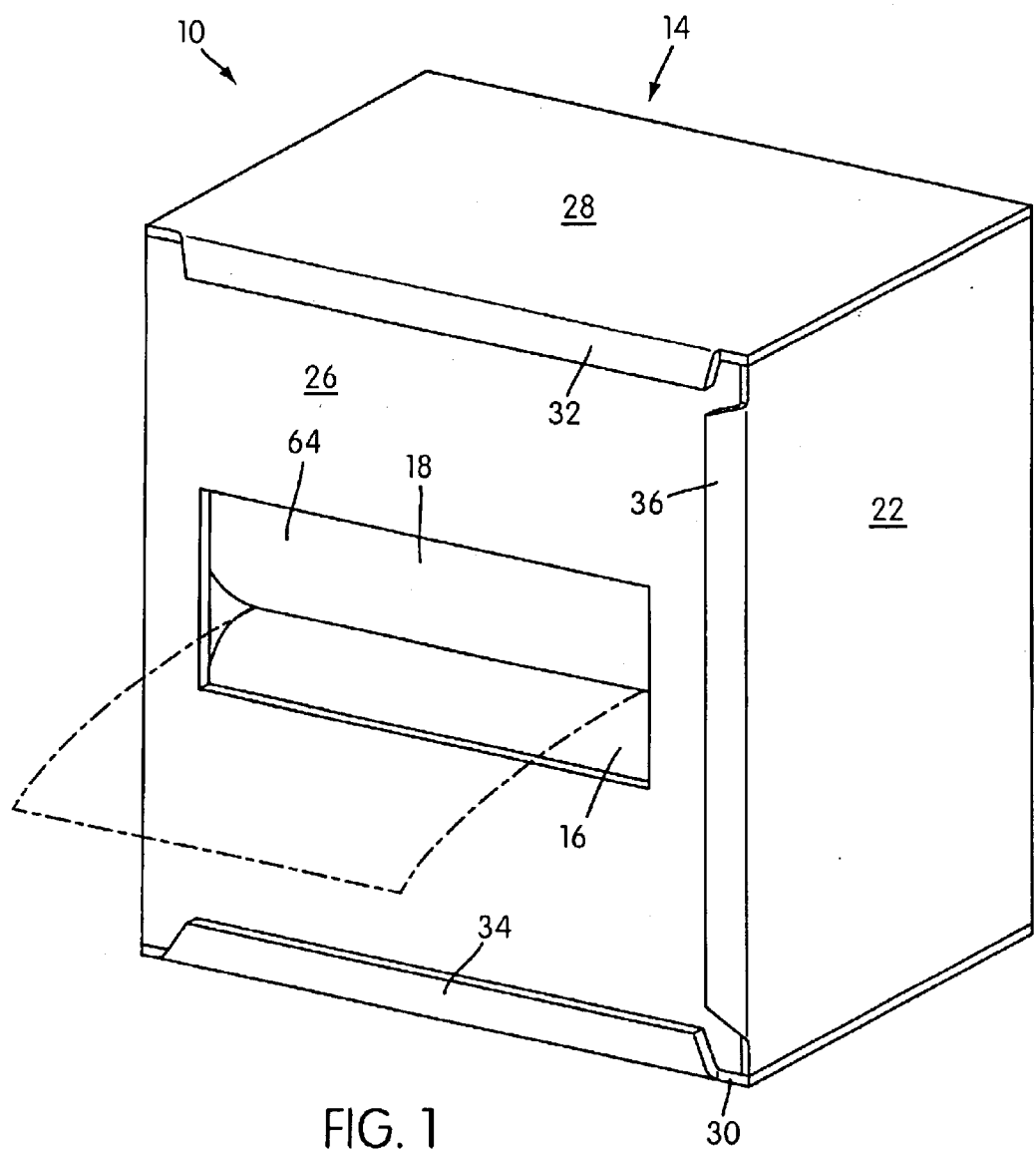
FIG. 1 is a perspective view of an embodiment of a substrate processing apparatus constructed in accordance with the principles of the present invention.
Figure 2:
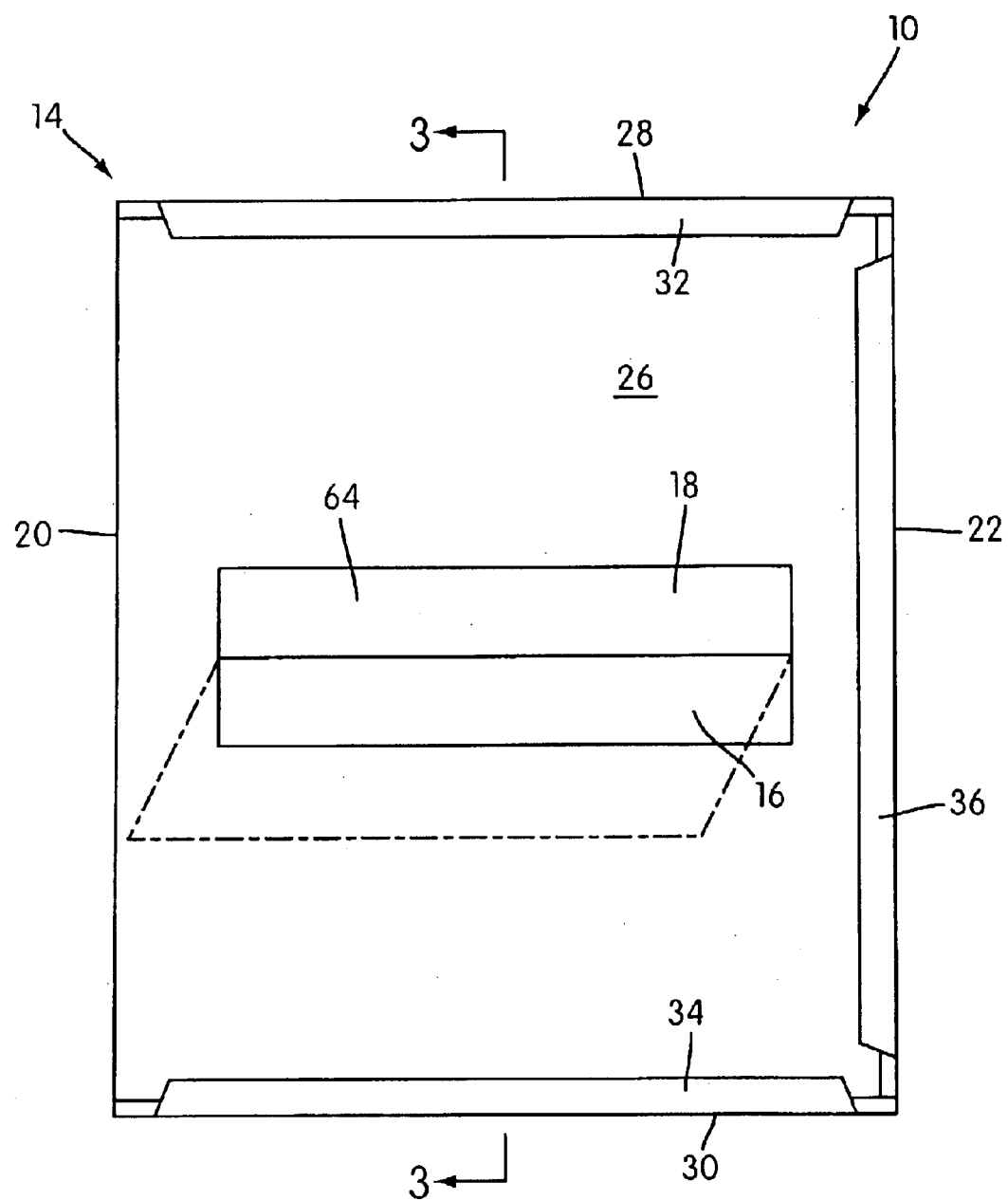
FIG. 2 is an elevated view of the substrate processing apparatus of FIG. 1 taken from the discharge side thereof.

FIG. 1 shows a substrate processing apparatus, generally indicated at 10, for performing a processing operation on a selected substrate 12. The selected substrate 12 may be any type of substrate desired to be processed, including but not limited to photographs, business cards, label stock, price tags, magazine cut-outs, name tags, etc. The apparatus 10 may be of any suitable size. The apparatus 10 illustrated is of a hand-held size that can be manually grasped and handled in one hand.

The apparatus 10 comprises a frame 14, a first supply roll 16, a second supply roll 18, and biasing structure, generally indicated at 19. The frame 14 in the illustrated embodiment is constructed of cardboard folded into a box shape having two sidewalls 20, 22, a feed sidewall 24, a discharge sidewall 26, a top wall 28, and a bottom wall 30. The top wall 28, the bottom wall 30, and the sidewall 22 each have a flap 32, 34, 36, respectively, at the free ends thereof. These flaps 32, 34, 36 are folded around and adhered, stapled or otherwise fixed to the discharge sidewall 26 to secure the frame 14 together.

Alternatively, the frame 14 may be formed from a single piece of plastic with living hinges. The plastic frame would be folded about the living hinges in a manner similar to the cardboard and heat-staked, glued, snap fit or otherwise fixed together for security. Broadly stated, both the cardboard and the plastic constitute a foldable material. The broad principles of the present invention, however, are not limited to the use of a frame 14 made from foldable material. The principles of the present invention may be practiced in a frame made of molded rigid plastic or metal. The foldable frame is preferred for cost savings purposes.

The first supply roll 16 comprises a core 38 and a first supply substrate 40 wound on the core 38. A pair of plastic supply roll supports 42, 44 are received inside the frame 14 adjacent the bottom wall 30 and sidewalls 20, 22 on opposite sides of the first supply roll 16. Each of the supports 42, 44 has a semi-circular recess 46, 48 and the opposing ends of the core 38 are cradled within these recesses 46, 48 to hold the supply roll 16. These supply roll supports 42, 44 comprise a first supply roll support structure.

The second supply roll 18 comprises a core 50 and a second supply substrate 52 wound about the core 50. A pair of second supply roll supports are secured by adhesive or threading to the opposing ends of the core 50. Alternatively, the supports 54, 56 may be loosely received on the ends of the core 50. The supply roll 18 and supports 54, 56 are disposed within the frame 14 with the laterally outer surfaces of the supports 54, 56 slidably engaging the interior surfaces of sidewalls 20, 22, respectively. These supply roll supports 54, 56 comprise a second supply roll support structure.

The cores 38, 50 and supply roll supports 42, 44, 54, 56 may be eliminated in the practice of the invention. These features are preferred to ensure that the supply rolls 16, 18 remain aligned and do not become displaced with respect to one another in the direction extending between the feed and discharge sidewalls 24, 26.

That is, the first supply roll support structure (i.e. supply roll supports 42, 44) and the second supply roll support structure (i.e. supply roll supports 54, 56) enable the supply rolls 16, 18 to move toward one another, but prevent relative movement thereof in the feeding direction to maintain the supply rolls 16, 18 in alignment.

Figure 3:
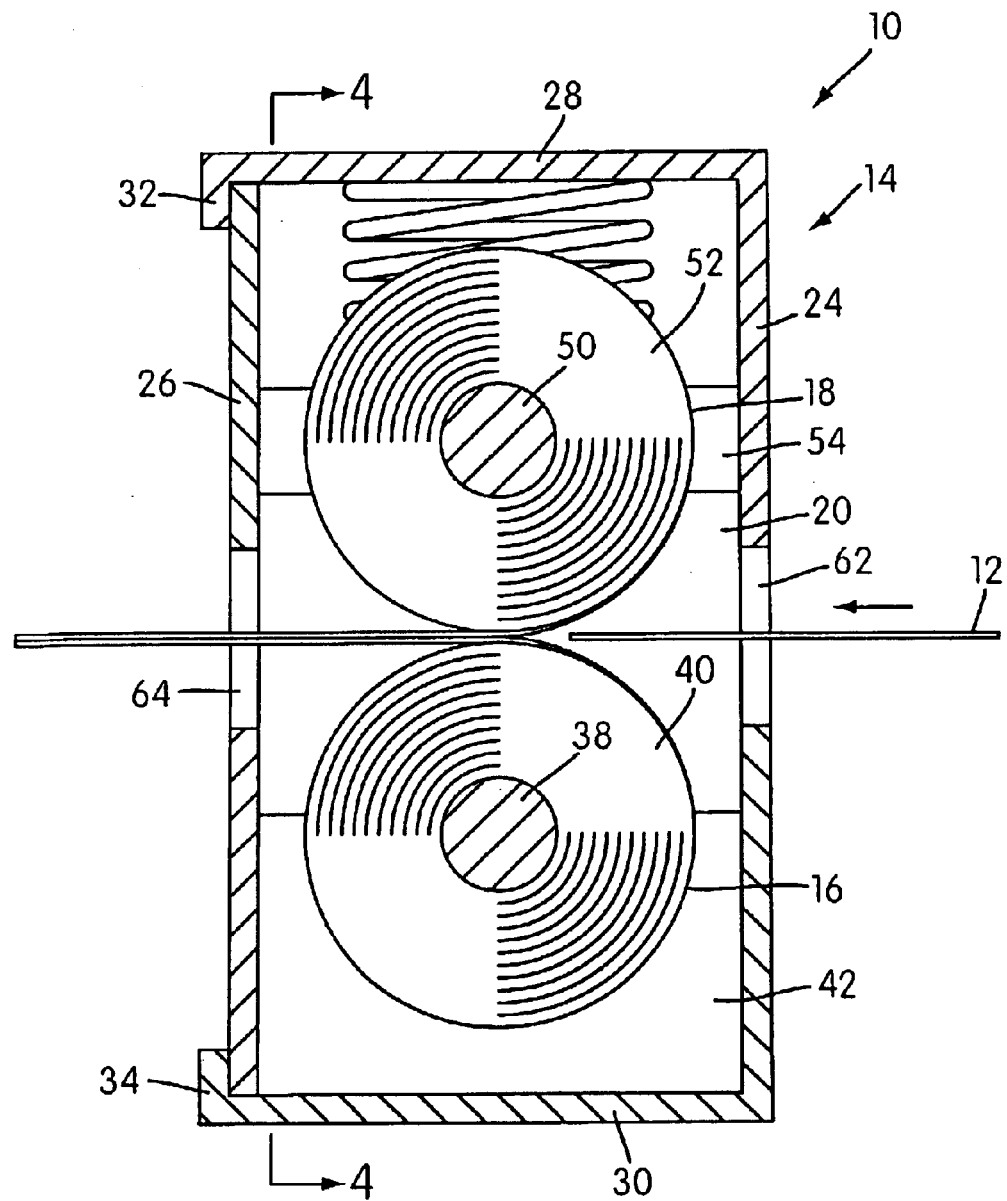
FIG. 3 is a cross-sectional view taken along line 3—3 in FIG. 2.
Figure 4:
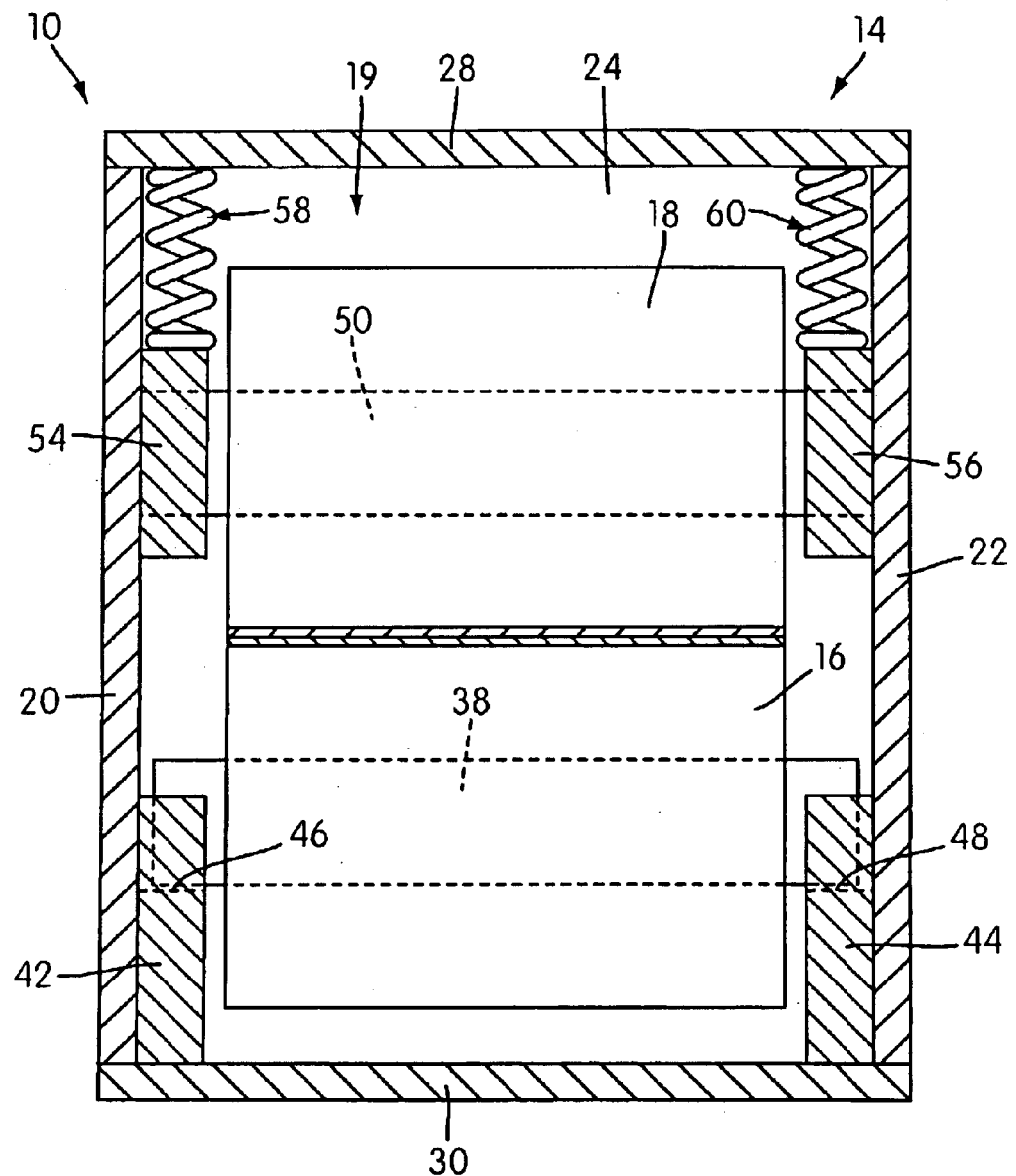
FIG. 4 is a cross-sectional view taken along line 4—4 in FIG. 3.

The biasing structure 19 in the embodiment illustrated in FIGS. 3 and 4 is in the form of a pair of ellipsoid coil springs 58, 60. These springs 58, 60 are positioned between the top wall 28 of the frame 14 and the second supply roll supports 54, 56, respectively. This biasing structure 19 biases the second supply roll 18 towards the first supply roll 16 so that the radially outermost portions of the supply substrates 40, 52 are pressed into engagement with one another in a manner similar to conventional nip rollers. Further, the biasing structure 19 continues to bias the supply rolls 16, 18 towards one another as the supply substrates 40, 52 are depleted therefrom to thereby maintain the pressed engagement of the supply rolls 16, 18. This keeps the supply rolls 16, 18 pressed together as their diameters are reduced due to depletion of the supply substrates 40, 52.

Any suitable biasing structure may be used for biasing the supply rolls 16, 18 into pressed engagement with one another. For example, a single spring may be used, a plurality of springs engaged between the frame walls and each of the supply rolls 16, 18 may be used, or springs engaged between the two supply rolls 16, 18 without engaging the frame 14 may be used. Alternatively, resilient material, such as resilient rubber members, may be used in place of the spring(s). Likewise, elastic rubber bands connected between the ends of the two cores 38, 50 may be used to bias the supply rolls 16, 18 together into pressed engagement.

Each of the supply substrates 40, 52 has a first surface and a second surface opposite the first surface. These supply substrates 40, 52 are wound about their respective cores 38, 50 so that the first surfaces thereof face radially outwardly with respect to their supply rolls 16, 18 and the second surfaces face radially inwardly with respect to their supply rolls 16, 18. The first surface of the first supply substrate 40 is coated with a layer of pressure-sensitive adhesive. Because the first surface of the first supply substrate 40 faces radially outwardly, the adhesive will likewise face radially outwardly.

For a normal laminating operation, both the supply substrates 40, 52 would be transparent films and the second supply substrate 52 would also have its first surface coated with a pressure-sensitive adhesive and its second surface treated with a release material, such as silicone or wax. The second surface of the first supply substrate 40 also has its second surface coated with a release material. Like the first supply roll 16, the adhesive on the second supply substrate's first surface faces radially outwardly. The release material on the second surfaces of the supply substrates 40, 52 prevents that adhesive from bonding thereto while wound on the supply rolls 16, 18. Instead of coating the second surfaces with release material, a release liner could be wound up with both of the supply substrates 40, 52 to prevent the adhesive on the first surface of each substrate 40, 52 from sticking to the second surface.

For a normal adhesive transfer operation, the first supply substrate 40 would be a differential release liner coated with release material on both its first and second surfaces. The release material on the second surface will prevent the adhesive from bonding thereto and the release material on the first surface will allow the pressure-sensitive adhesive thereon to transfer to the selected substrate without remaining bonded to the first surface. The second supply substrate 52 would be a mask substrate that carries no adhesive. The first surface of the mask substrate may be left untreated or, alternatively, it may be treated with a release material to prevent adherence of the adhesive on the first supply substrate 40 thereto. The role of the mask substrate will be explained hereinbelow with respect to the operation of the apparatus 10.

For a combination laminating/adhesive transfer operation, the first supply substrate 40 would be a differential release liner as described above for a normal adhesive transfer operation. The second supply substrate 52, however, would be a transparent film having its first surface coated with a pressure-sensitive adhesive and its second surface coated with a release material as described above for a normal laminating operation. In a combination laminating/adhesive transfer operation, the second supply substrate 52 (the transparent film) is adhered to one surface of the selected substrate, and the pressure sensitive adhesive on the first supply substrate 40 (the release liner) is adhered to the other surface of the selected substrate 12. The supply substrates 40, 52 are trimmed around the periphery of the selected substrate 12 and the release liner is peeled back to expose the adhesive, thus providing a selected substrate 12 that is adherable like a label, but protected on one side by a laminating film.

For a magnet making operation, the first supply substrate 40 would be made from a magnetized material, as in U.S. Provisional Application of Neuburger, Ser. No. 60/197,684, filed Apr. 17, 1999, the entirety of which is hereby incorporated into the present application by reference. The second supply substrate 52 would be a mask substrate as discussed above with respect to the normal adhesive transfer operation.

Figure 5:
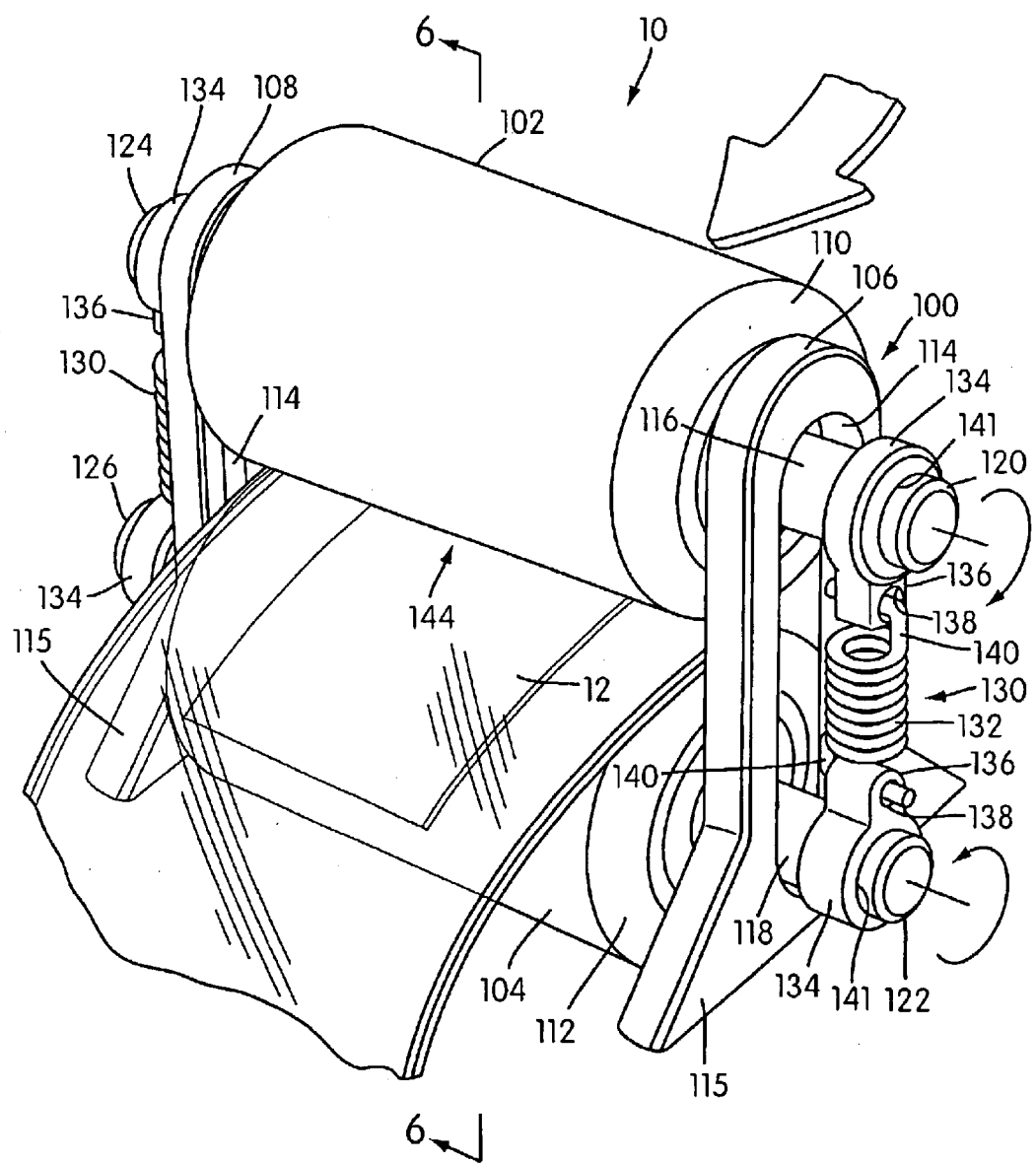
FIG. 5 is a perspective view of another embodiment of a substrate processing apparatus constructed in accordance with the principles of the present invention.

FIG. 5 shows another embodiment of the substrate processing apparatus 10. As shown, the apparatus 10 includes a frame 100 and first and second supply rolls 102, 104. The supply rolls 102, 104 are mounted between first and second supply roll supports 106, 108. The first and second supply roll supports 106, 108 are upstanding and situated at respective opposite ends of the supply rolls 102, 104. The supply rolls 102, 104 are positioned parallel and adjacent one another and are retained in this orientation by the supply roll supports 106, 108. First and second supply rolls 102, 104 include respective first and second supply substrates 110, 112, which are similar to supply substrates 40, 52 described above.

As shown in FIG. 5, each of the first and second supply roll supports 106, 108 includes an longitudinally extending (relative to the supply rolls 102, 104) elongated opening 114. As shown, the openings 114 are elongate in a pressing direction, parallel to a plane containing longitudinal axes of both supply rolls 102, 104. In the embodiment illustrated in FIG. 5, the pressing direction is generally vertical, however it is contemplated that the pressing direction may be other than vertical, as will be discussed in further detail below.

A portion of the supply roll supports 106, 108 may be formed to provide a support surface engaging structure 115. As shown in FIG. 5, a lower portion of the supply roll supports 106, 108 may extend laterally outwardly (relative to the supply roll supports 106, 108) to provide the support surface engaging structure 115. With this configuration, the apparatus 10 may stably engage the support surface, provided, for example, by a table or desk.

The first and second supply rolls 102, 104 include respective cores 116, 118 on which the first and second supply substrates 110, 112 may be wound. As shown, it is preferable for the cores 116, 118 to extend past the longitudinal extent of the wound supply substrates 110, 112. In other words, opposite longitudinal end portions of each supply roll 102, 104 are formed by respective end portions of associated cores 116, 118. As shown in FIG. 5, end portions 120, 122 of cores 116, 118, respectively, extend through the opening 114 in the first supply roll support 106, while end portions 124, 126 of cores 116, 118, respectively, extend through the opening 114 in the second supply roll support 108. It is noted that a width of the openings 114 may be generally equal to or slightly larger than a diameter of the cores 116, 118. As such, each of the cores 116, 118 is slidable within the openings 114 of the supply roll supports 106, 108.

A biasing structure, shown generally at 130, serves to bias the first and second supply rolls 102, 104 toward each other. As shown in FIG. 5, the biasing structure 130 may be in the form of a pair of coiled extension springs 132 connectable between respective end portions (120–126) of cores 116, 118. It is noted that the biasing structure 130 may be in the form of other resilient elements, including other types of springs and elastomeric members. It is also noted that the biasing structure 130 may bias each of the cores 116, 118 toward an opposite end of the supply roll supports 106, 108, thereby pressing the supply rolls 102, 104 together, as shown in FIG. 5.

The biasing structure 130 also includes core mounting structures 134, one of which is disposed on each end portion 120, 122, 124, and 126 of each core 116, 118. The core mounting structures 134 are rotatably mounted to the respective end portions (122–126), so that as the supply rolls 102, 104 rotate, the core mounting structures 134 are able to maintain a generally constant rotational orientation relative to the supply rolls 102, 104. Further, each of the core mounting structures 134 includes a connecting portion 136 extending radially outwardly therefrom. The connecting portions 136 include connecting structures 138, which are connectable with respective ends of springs 132. Shown in FIG. 5, the connecting structures 138 may be provided by openings within respective connecting portions 136. Each end of the springs 132 form an engaging portion 140, which is connectable with the associated connecting structure 138. In this manner, the core mounting structures 134 mounted to each spring 132 and, therefore the supply rolls 102, 104, are biased toward each other by the springs 132 in the pressing direction corresponding to a direction of deflection of the springs 132.

It is contemplated that the core mounting structures 134 include journaling openings 141, which include respective internal cylindrical surfaces. The end portions 120-126 of the cores 116, 118 are engaged within respective journaling openings 141 and are rotatable relative thereto. Each of the end portions 120–126 may include a retaining element (not shown) to prevent substantial relative axial movement (relative to the respective core 116, 118) between the cores 116, 118 and the supply roll supports 106, 108. In other words, a retaining element may be disposed on each end portion 120-126 to prevent axial movement of the core mounting structures 134 on the end portions 120–126 outwardly past the retaining element. In this manner, the cores mounting structures 134 may be prevented from sliding out of engagement with the cores 116, 118. Likewise, the cores 116, 118 may be prevented from sliding out of openings 114.

The apparatus 10 of the embodiment shown in FIG. 5 is configured such that, as the supply substrates 110, 112 are unwound from the supply rolls 102, 104 during, for example, a laminating process, the supply rolls 102, 104 are simultaneously pulled toward one another by the biasing structure 130. As such, the supply rolls 102, 104 maintain an operative pressing force (in the pressing direction) between one another as the supply rolls 102, 104 are reduced in diameter (since the supply substrates 110, 112 are unwound from respective supply rolls 102, 104). Therefore, the supply rolls 102, 104 maintain their engagement with each other and apply an adequate pressing force to the supply stock and selected substrate 12 when an operation is performed.

Figure 6:
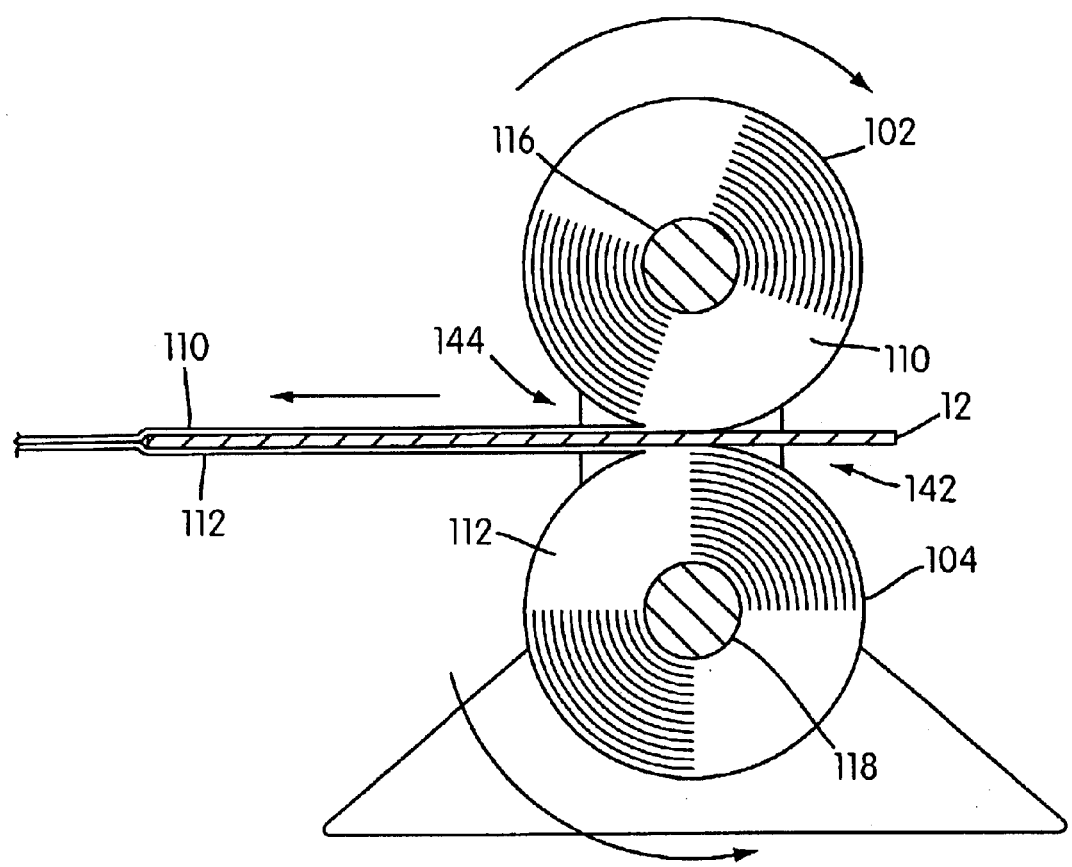
FIG. 6 is a cross-sectional view taken along line 6—6 in FIG. 5.

A feed side opening 142 is formed by the supply rolls 102, 104, as shown in FIG. 6. The selected substrate 12 may be pushed between the supply rolls 102, 104, as shown, to emerge from a discharge side opening 144 with the supply substrates 110, 112 affixed thereto. While the selected substrate 12 is disposed between the supply rolls 102, 104, the pressing force acts thereon and on the supply substrates 110, 112.

It is noted that the embodiment of the apparatus 10 described above and shown in FIGS. 5 and 6 may be used for any operation described above with respect to the embodiments of the apparatus 10 shown in FIGS. 1–4.

Operation

To use any embodiment of the the apparatus 10 of the invention, irrespective of what type of operation is being performed, the user inserts the selected substrate 12 into the feed side opening 62 or 142 and feeds the lead end thereof between the pressed together supply rolls 16, 18 or 102, 104. The user then advances the selected substrate 12 between the supply rolls 16, 18 or 102, 104 so that the pressed engagement of the supply rolls 16, 18 or 102, 104 presses first surfaces of both supply substrates 40, 52 or 110, 112 against the opposing sides of the selected substrate 12 so as to affect adhesive bonding between the substrates 12, 40, and/or 52 or 12, 110, and/or 112. As the selected substrate 12 is advanced between the supply rolls 16, 18, or 102, 104 the portions of the first and second supply substrates 40, 52 or 110, 112 unwind from their supply rolls 16, 18 or 102, 104 and advance together with the selected substrate 12 out through the discharge side opening 64 or 144.

Advancement of the selected substrate 12 may be affected by manually pulling on the free ends of the first and second supply substrates 40, 52 or 110, 112 extending out the discharge side opening 64 or 144. Alternatively, for an apparatus particularly designed for normal adhesive transfer or magnet making, a take-up roll (not shown) driven by a knob or actuator may be utilized to wind up the second supply substrate 52 or 112 as shown in U.S. patent application of Ensign, Jr. et al., Ser. No. 09/564,587, filed May 5, 2000 the entirety of which is hereby incorporated into the present application by reference.

For a normal laminating operation, the discharged product will be the selected substrate 12 with laminating films adhered to the opposing sides thereof. If desired, the films may be trimmed around the periphery of the selected substrate 12.

For a normal adhesive transfer operation, the discharged product will be the selected substrate 12 with the pressure-sensitive adhesive from the release liner bonded to one side thereof and the release liner covering the bonded adhesive. The mask substrate covers the other side of the selected substrate 12 and any portions of the release liner and adhesive exposed around the periphery of the selected substrate 12. If the first surface of the mask substrate is treated with a release material, then it will simply serve to cover the excess adhesive around the periphery of the selected substrate 12 until such time as the user desires to peel back the mask substrate and remove the selected substrate 12 from the release liner for adherence to a contact surface. However, in accordance with the teachings of the aforementioned '417 and '962 patents, the entirety of each of which is hereby incorporated into the present application by reference, the first surface of the mask substrate may remain untreated and thus have an affinity for bonding with the excess adhesive exposed around the periphery of the selected substrate 12. The mask substrate will then bond with this excess adhesive during the processing operation. As a result, peeling back the mask substrate from the release liner and selected substrate 12 will strip away the excess adhesive prior to peeling the selected substrate 12 from the release liner.

For a combination laminating/adhesive transfer operation, the discharged product will be the selected substrate 12 with (a) the pressure-sensitive adhesive from the release liner bonded to one side thereof and the release liner covering the bonded adhesive and (b) a laminating film covering and protecting the other side of the selected substrate 12. The selected substrate 12 can be trimmed around its periphery, if desired, and the release liner can be peeled back to enable the selected substrate 12 to be adhered to a contact surface as desired with the laminating film protecting the opposite side.

For a magnet substrate, the discharged product will be the magnet substrate bonded to one side of the selected substrate 12 and the mask substrate covering both the other side of the selected substrate 12 and any portions of the magnet substrate and adhesive exposed around the periphery of the selected substrate 12. If the first surface of the mask substrate is treated with a release material, then it will simply serve to cover the excess adhesive around the selected substrate 12 so as to enable the user to trim the magnet substrate around the periphery of the selected substrate 12 with the mask substrate covering that excess adhesive.

The first surface of the mask substrate may remain untreated and thus have an affinity for bonding with the excess adhesive exposed around the periphery of the selected substrate 12. As a result, peeling back the mask substrate from the magnet substrate and the selected substrate 12 will strip away the excess adhesive prior to trimming the magnet substrate to the periphery of the selected substrate 12.

The foregoing detailed description has been provided to illustrate the structural and functional principles of the present invention and is not intended to be limiting. To the contrary, the present invention is intended to encompass all alterations, modifications, and substitutions within the spirit and scope of the following claims.

What is claimed:

1. A method for processing a selected substrate, comprising:

providing a rotatable first supply roll comprising a first supply substrate having a first surface and a second surface, said first surface having a layer of pressure-sensitive adhesive disposed thereon, said first supply substrate being wound about said first supply roll such that said first surface thereof and said adhesive layer face radially outward with respect to said first supply roll;

providing a rotatable second supply roll comprising a second supply substrate having a first surface and a second surface, said second supply substrate being wound about said second supply roll such that said first surface thereof faces radially outward with respect to said second supply roll;

pressing said first and second supply rolls together such that said first surfaces of said first and second supply substrates are pressed into engagement with one another; and while said first and second supply rolls are pressed together, advancing the selected substrate between the supply rolls so that (a) the pressed engagement of said supply rolls presses the first surfaces of said first and second supply substrates against opposite sides of the selected substrate so as to cause said adhesive to bond to said selected substrate and (b) the portions of said first and second supply substrates pressed against said selected substrate are unwound from said supply rolls and advanced together with the selected substrate.

2. A method according to claim 1, wherein said first and second supply rolls are pressed together by biasing structure.

3. A method according to claim 1, wherein said first and second supply rolls are provided in a frame.

4. A method according to claim 1, further comprising continuing to press said supply rolls together as said supply substrates are depleted from said supply rolls to thereby maintain the pressed engagement of said supply rolls.

5. A method according to claim 4, wherein biasing structures presses and continues to press said supply rolls together.

* * * * *